UNITED STATES PATENT OFFICE.

RAYMOND G. OSBORNE, OF LOS ANGELES, CALIFORNIA.

PROCESS OF TREATING CONCRETE OR THE LIKE.

1,383,749.      Specification of Letters Patent.      Patented July 5, 1921.

No Drawing.      Application filed December 26, 1919. Serial No. 347,491.

*To all whom it may concern:*

Be it known that I, RAYMOND G. OSBORNE, a citizen of the United States, residing at Los Angeles, in the county of Los Angeles, State of California, have invented new and useful Improvements in Processes of Treating Concrete or the like, of which the following is a specification.

This invention relates to processes and methods of treating concrete or similar materials for the purpose of rendering them waterproof. As hereinafter stated, my process is not limited to be used in connection only with concrete, but may be used for waterproofing and treating other materials, such as brick and other more or less porous earthy materials. And, although my process is susceptible of a very wide variety of applications, yet it will be sufficient, and most instructive, to explain the use of my process as applied, for instance, to concrete piles. Conditions obtaining in concrete piles, and other concrete work, exposed to sea water, or any water containing certain minerals, greatly demand the complete and thorough waterproofing of the concrete. However, by my adoption of specific description relating to piles, it will not be understood that my process is at all limited to such concrete piles; because, as will be readily seen from the following description, the process contemplates generally a thorough waterproofing of any kind of article of a material of the character herein set forth.

Broadly speaking, there have been proposed in the past, three methods of making concrete impervious to moisture and of preventing deleterious action of mineral charged waters, for instance, sea water, upon concrete. These three methods may be briefly described as follows: (1) The proper proportioning of the aggregates of the concrete, and very careful and uniform mixing of the aggregates, and very careful placing and aging of the formed concrete. This tends to produce the most impervious concrete and also to produce a concrete with the best lasting quality. But the difficulties inherent in this method of procedure are largely those of difficulty in obtaining proper uniform mixture and placing. The slightest inattention on the part of a careless workman will render negatory all of the best and most carefully considered plans in this direction. (2) Concrete is sometimes mixed with a powder or paste waterproofing material or compound. These compounds either depend upon their void filing qualities or upon their water repelling qualities to make the concrete waterproof; but in no known case do they render the concrete entirely waterproof. (3) The third method is to apply a surface coating of asphalt or some similar waterproofing material; and the inherent shortcoming of this method is that the waterproofing material forms only a thin coat, is liable to be removed, and is, in fact, very frequently accidentally removed in practice; with the result that the concrete is then immediately exposed, water enters the concrete and acts upon the whole interior of the concrete almost as readily as if the whole surface were exposed.

My invention is designed to overcome all the difficulties of these various forms of attempted waterproofing; and the success of my process may be nowhere better illustrated than in connection with concrete piling. Concrete piling as used for piers, walls, etc., is made in various ways; but in every case the concrete is exposed to the action of sea water. The sea water enters the concrete by way of the myriad capillary openings, and thus chemical action is set up on the concrete over an aggregate surface which is perhaps thousands of times greater than the superficial exposed surface of the concrete. The result is that the concrete very rapidly deteriorates, and after a while the concrete is transformed to a mass which has practically no strength at all.

By my process all of these myriad capillary passages are filled with a waterproofing material—for instance, asphalt. The concrete body is first formed and properly aged to give the proper strength. It is then heated preferably, as I now practise the process, to about four or five hundred degrees F. The upper limit depending upon the ability of the concrete to retain sufficient strength. As the concrete is heated up the air contained in its capillary passages is first expelled. The free contained water is then, as boiling temperature is reached, expelled and at about two hundred twelve degrees F. all of the free contained water will be expelled. The heating should not be carried on too quickly. As the temperature rises beyond the last mentioned point, a certain part of the water of combination of the concrete is expelled. This heating may take place in a bath of the waterproofing substance; and the high temperature may be maintained for a suitable period to allow penetration of the body by the liquid substance by capillary and gravitational action. However, I may, and preferably do, allow the body also to cool in the liquid to cause the liquid to be drawn into the voids, as will be now explained.

Next, I allow the concrete body to cool in the presence of (preferably in the bath of) hot liquid waterproofing material, such as asphalt. As the concrete gradually cools down, the cooling and condensation of the thinly attenuated, expanded steam remaining in its capillary passages and voids, causes the production of a comparatively high vacuum, this vacuum acting in addition to gravitational action and capillary action, causes the liquid asphalt to penetrate the concrete and to fill all of its capillary passages and voids. When the concrete and asphalt have cooled to a temperature near ordinary temperature, but before the asphalt has become again hardened, by cooling, the concrete is removed.

The distance to which asphalt will penetrate the concrete under these conditions depends upon the liquidity of the asphalt, upon the amount of vacuum obtained, the porosity of the concrete and upon other conditions which affect the freedom with which the asphalt can enter the concrete. (In any given case, the asphalt will enter the concrete to a distance where the friction of the asphalt passing through the capillary passage equals pulling tension of the interior vacuum.) I have not as yet found any limit to the depth of penetration under proper conditions. It is not necessary to obtain great penetration. Furthermore, I may say in this connection that a concrete which is more porous (a concrete which is ordinarily considered a poorer concrete as compared with the finest grade of impervious concrete) is better for my process than is the finest grade of concrete; allowing penetration by the asphalt more freely. And, such a poorer grade of concrete is very materially increased in strength, both tensile and compressive, by my process. Thus the result of my process, as applied to concrete, is not only to waterproof the concrete, but is also to improve and increase its strength.

Now in carrying out my process upon concrete, or upon any other kind of similar material which is more or less porous, as for instance, earthenware, brick, or the like, it is not entirely necessary that anything but air be expelled from the porous body in order to have it impregnated with the asphalt. For instance, a perfectly dry body may be heated up to a suitable temperature and may then be allowed to cool in a bath of liquid asphalt of about the same temperature; and the cooling of the expanded air in the body will then form the vacuum which will draw the asphalt in to the body. But I prefer, in actual practice, to supply such a body with water, so that, when it is heated, steam will be formed. The expansion of the water into steam drives out all of the air, and, when the highly expanded steam is again cooled and condensed into water, a very high vacuum is formed, having a strong action to pull in the asphalt.

It will be readily understood that most concrete, particularly concrete which has just been formed and aged, contains sufficient free water for the most effective carrying out of my process without the concrete having to be especially wetted for the purpose of my process.

Furthermore, it will be noted that in the above given example of the application of my process, I have said that the temperature is carried high enough to drive off some of the water of combination. This I find desirable in waterproofing concrete for several reasons: Asphalt which has a substantial body at ordinary temperatures, does not become very fluid until it reaches four or five hundred degrees F. and it is desirable to place the concrete in the asphalt bath with the asphalt at about the same temperature of the concrete so as to avoid any quick change of temperature. Furthermore, the driving off of some of the water of combination is especially desirable in that the voids or spaces filled by such water are subsequently filled or replaced by the asphalt; making, I consider, a more thorough waterproofing for the concrete, and materially increasing the strength of the concrete by reason of filling the water voids with a material which has an individual strength. It will be thus apparent that an important feature of my process, in one of its phases, is the replacement of water of combination with a material of the characteristics stated regardless of what other operations may be effected.

After the desired temperature has been reached, the concrete body and bath are allowed to cool slowly, so as to give sufficient time for the ample penetration of the concrete as the concrete and the asphalt cool off; and then, when the temperature has reached a point about the boiling point of water, the concrete body may be removed from the asphalt. Of course this removal must take place before the asphalt has again solidified.

In my process, although the vacuum or suction action may be the main impelling force which draws the asphalt or asphalt-like material, or other suitable waterproofing material, into the concrete or other porous substance; yet it will be seen that capillary action plays some part in this penetration and that also gravitation, or the liquid pressure caused by gravitation, may play some part in assisting the suction action. When the porous material is immersed in the liquid bath, there is of course a certain amount of liquid pressure due to gravity. This liquid pressure may be increased, either by increasing the depth of the bath or by placing pressure upon the surface of the liquid.

Some of my best results in treating concrete have been obtained by carrying out my process in the following stated manner: The asphalt is first heated sufficiently to cause it to liquefy and the concrete then submerged in this heated liquefied asphalt. The temperature of the asphalt bath and the concrete is then raised to about 400° F. and held at that point until no more steam escapes from the concrete. Foaming of the asphalt may be easily controlled by playing an open flame downwardly into the foam. This flame will break up bubbles and cause the foam to subside.

After holding the temperature until no more steam escapes, the temperature is allowed then to drop slowly, with the concrete still submerged, until a temperature about the boiling point of water is reached, when the concrete is taken from the asphalt bath. The exact temperature at which the concrete is removed from the asphalt bath may vary with different asphalts; if the asphalt remains sufficiently liquid below boiling temperature, the temperature may be lowered below boiling before removing the concrete.

If it is desired to do away with the foaming of the asphalt, the asphalt bath and the concrete may be heated up separately and the concrete then placed in the asphalt bath after steam has ceased to be driven off from the concrete at the temperature held.

In some cases, and this may be particularly true with concrete having large porosity, it may be sufficient to merely maintain the concrete at the upper temperature in the asphalt without necessarily allowing it to cool in the asphalt. This procedure drives off a part of the water of combination of the concrete and fills the voids of the concrete with the asphalt or other material to at least a partial degree or to at least a limited depth of penetration. This is one of the features of my process to which I lay claim, regardless of whether the final suction action is used or not.

The finished product has a brown black color; and sections of it show that every interstitial space of the concrete is filled with the asphalt. The finished product is thoroughly waterproofed; the concrete is fully protected against chemical action, and no water can pass through the concrete. Although I have herein emphasized somewhat those features of my process which have to do with overcoming deterioration of piles, etc., exposed to sea water action, yet it will be seen that the main and primary object of my invention, and the effect of my process, is to render concrete and the like waterproof. And thus it will be readily seen that my process may be applied to any kind of similar porous material to be used in any situation where it is desired to have the material waterproofed or impervious to any liquid or gas; that is, my process is applicable wherever it is desired to render any porous body impervious to fluid. Incidentally, I may mention that my process renders concrete electrically non-conductive; and this, in addition to the fluid-proofing qualities, makes my process particularly applicable to electrical conduits, etc., as well as to all piping.

Having described a preferred form of my invention, I claim:

1. A process for rendering concrete impervious to fluids, comprising the heating of the concrete to a temperature sufficient to vaporize and drive off a part of its water of combination, and then allowing the heated concrete to cool in the presence of a liquid material of fluid-proofing characteristics.

2. A process for rendering concrete impervious to fluids, comprising the heating of the concrete to a temperature sufficient to vaporize and drive off a part of its water of combination, and then allowing the heated concrete to cool in a bath of asphalt-like material which has been initially heated to a temperature substantially the same as that to which the concrete has been heated.

3. A process for rendering concrete impervious to fluid, embodying first wetting the concrete, then heating the concrete to a temperature sufficient to vaporize and drive off its contained water and also to vaporize and drive off a part of its water of combination, and then allowing the heated concrete to cool in a bath of asphalt-like material heated initially to a temperature substantially the same as that to which the concrete has been heated, and the concrete and the asphalt bath being allowed to cool to a temperature approximately that of the boiling point of water before removal of the concrete from the bath.

4. A process for rendering concrete impervious to fluids, embodying the removal of the contained air and free water, and the partial removal of combined water from the concrete, and then filling the spaces with a substance having the characteristics of asphalt.

5. A process for rendering concrete impervious to fluids, embodying subjecting the concrete, in the presence of a substance having the characteristics of asphalt, to a temperature sufficient to drive off a part of the water of combination of the concrete.

6. A process for rendering concrete impervious to fluids, embodying subjecting the concrete to a temperature sufficient to drive off a part of its water of combination, and then filling the voids of the concrete with a material having the characteristics of asphalt.

7. A process for rendering concrete impervious to fluid, embodying wetting the concrete, then heating it to a temperature sufficient to vaporize and drive off its contained water and a part of its water of combination, and then allowing the heated concrete to cool in the presence of a liquid material of fluid-proofing characteristics.

8. A process for rendering concrete impervious to fluids, embodying subjecting the concrete to a temperature sufficient to drive off part of its water of combination, and then filling the voids of the concrete with a material of fluid-proofing characteristics.

9. A process for rendering concrete impervious to fluids, embodying subjecting the concrete, in the presence of a substance having fluid-proofing characteristics, to a temperature sufficient to drive off part of the water of combination of the concrete, and then allowing the concrete to cool in the presence of said substance.

In witness that I claim the foregoing I have hereunto subscribed my name this 18th day of November, 1919.

RAYMOND G. OSBORNE.

Witness:
VIRGINIA BERINGER.